July 2, 1963 E. D. DUNN, JR 3,096,047
THERMALLY CONTROLLED BUOYANT VEHICLE
Filed Jan. 5, 1962 5 Sheets-Sheet 1

Edward D. Dunn, Jr.
INVENTOR.

July 2, 1963  E. D. DUNN, JR  3,096,047
THERMALLY CONTROLLED BUOYANT VEHICLE
Filed Jan. 5, 1962  5 Sheets-Sheet 4

Edward D. Dunn, Jr.
INVENTOR.

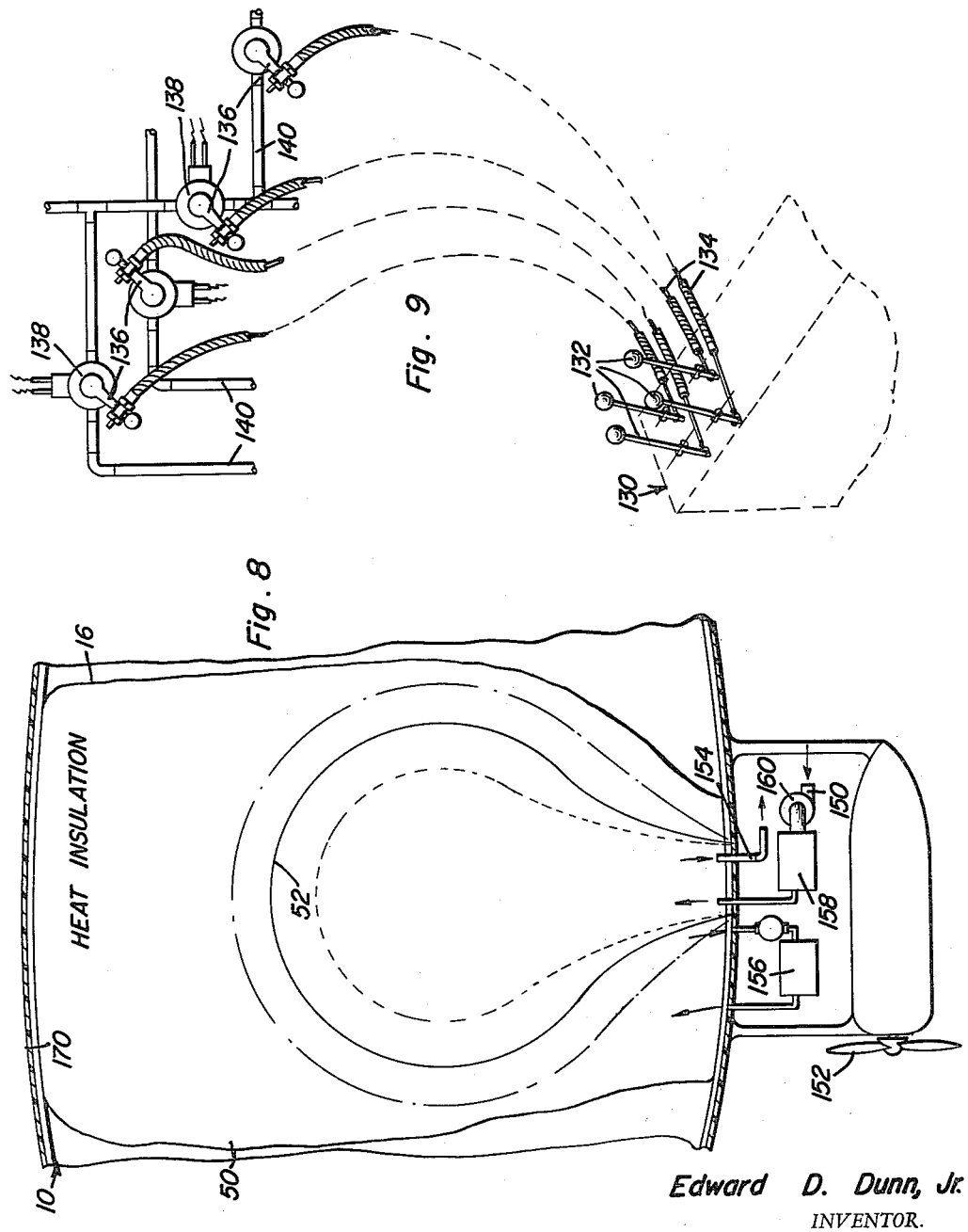

United States Patent Office 3,096,047
Patented July 2, 1963

3,096,047
THERMALLY CONTROLLED BUOYANT VEHICLE
Edward D. Dunn, Jr., Columbus, Ga.
(Rte. 1, Greenfield Plantation, Morgan, Ga.)
Filed Jan. 5, 1962, Ser. No. 164,488
11 Claims. (Cl. 244—26)

This invention comprises a novel and useful thermally controlled buoyant vehicle and while directly applicable to both marine and aerial vehicles is particularly related to an aircraft of the lighter than air type, including features which greatly enhance the maneuverability and the precision of control of the vehicle.

Although the drawings and the description hereinafter specifically disclose and describe the application of the principles of this invention to an aircraft, it will be readily apparent that many of the principles and features set forth may likewise be advantageously incorporated in submarines and other vehicles of variable buoyancy.

For many purposes aircraft of the lighter than air type perform highly important and useful functions. A very important quality of such aircraft is in their ability to hover substantially stationary at different elevations and in varying proximity to the ground, thereby enabling many useful operations to be performed. For such uses, an aircraft permitting precise control and rapid variation of its buoyancy in order to variably control with precision its altitude is highly desirable.

The basic object of this invention is to provide a vehicle, either marine or aeronautical, whereby the buoyance of the entire vehicle or selected portions and regions thereof may be quickly and controllably varied and this without a loss of the buoyant fluid and primarily by the varying of the temperatures and volume of the confined buoyant fluid.

It is a primary purpose of this invention to provide an aircraft possessing to the maximum the above identified properties.

A further object of the invention is to provide an aircraft which will combine in a single vehicle the characteristics of a lighter than air vessel together with the use of helicopter blades as both a propulsion means and as a means for effecting vertical ascent and descent.

Another important object of the invention is to provide a construction which will render the buoyant means more sensitive to the operator's control by shielding the buoyant means from heat exchange with the surrounding atmosphere.

A still further object of the invention is to provide an aircraft in accordance with the preceding objects which will enable the obtaining of a quick and precise control and adjustment of its buoyancy with sufficient rapidity to meet rapidly changing flying conditions.

A still further important object of the invention is to provide a device in accordance with the preceding objects which will enable the use of heating and cooling means to effect a selective expansion or contraction of expansible containers of a lifting gas in order to thus selectively increase or decrease the net positive and negative weight of the aircraft.

A still further object of the invention is to provide an apparatus in accordance with the preceding objects which through the use of an improved heat exchange system for receiving heat from such sources as an internal combustion engine power plant of the vessel, a supplemental heating furnace or the like may effectively distribute this heat and selectively apply it to individual components of the buoyant gas system of the vessel to thereby obtain a precise control of the trim of the vessel as well as the very rapid regulation of its effective buoyancy and weight.

Still another purpose of the invention is to provide a device in accordance with the preceding objects which by slight variations as to its structure may be readily applied to lighter than air craft of either the rigid or non-rigid type.

Still another purpose of the invention is to provide a buoyancy regulating system for lighter than air vessels in which heat obtained from the exhaust products of the internal combustion engine of the power plant of the vessel may be utilized to controllably heat and thereby regulate the volume of individual expansible containers of a buoyant gas without any direct contact of the exhaust products with the buoyant gas or its containers.

Yet another object is to provide a buoyancy regulating system for lighter than air vehicles having manually operable means for individually and controllably varying the buoyancy of individual buoyancy compartments in the vehicle selectively from stations adjacent said compartments and from a common control station in the vehicle.

Still another object of the invention is to provide a lighter than air vessel which combines therein the advantages of a controllable buoyancy varied from negative to positive values for the aircraft with a helicopter blade propulsion system whose thrust may be varied as to direction for either propulsion or for vertical ascent and descent purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 8 is a fragmentary detail view similar to FIGURE 4 but showing the principles of this invention applied to the non-rigid type of lighter-than-air vehicles; and, FIGURE 9 is a diagrammatic view of the dual control system of the heat exchange system.

In the accompanying drawings there is set forth as an illustration of the manner for practicing the principles of this invention a lighter than air craft of the usual shape as indicated by the numeral 10, and which may be of the conventional rigid type, as illustrated in FIGURES 1-5 or of the conventional non-rigid type as shown in FIGURE 8.

The aircraft 10 whether rigid or non-rigid will include the usual hull or compartment 12 in which is housed the power plant and other equipment of the vehicle as well as passengers' quarters, and from which may be suspended a cargo carrier such as that indicated at 14.

Figure 3:
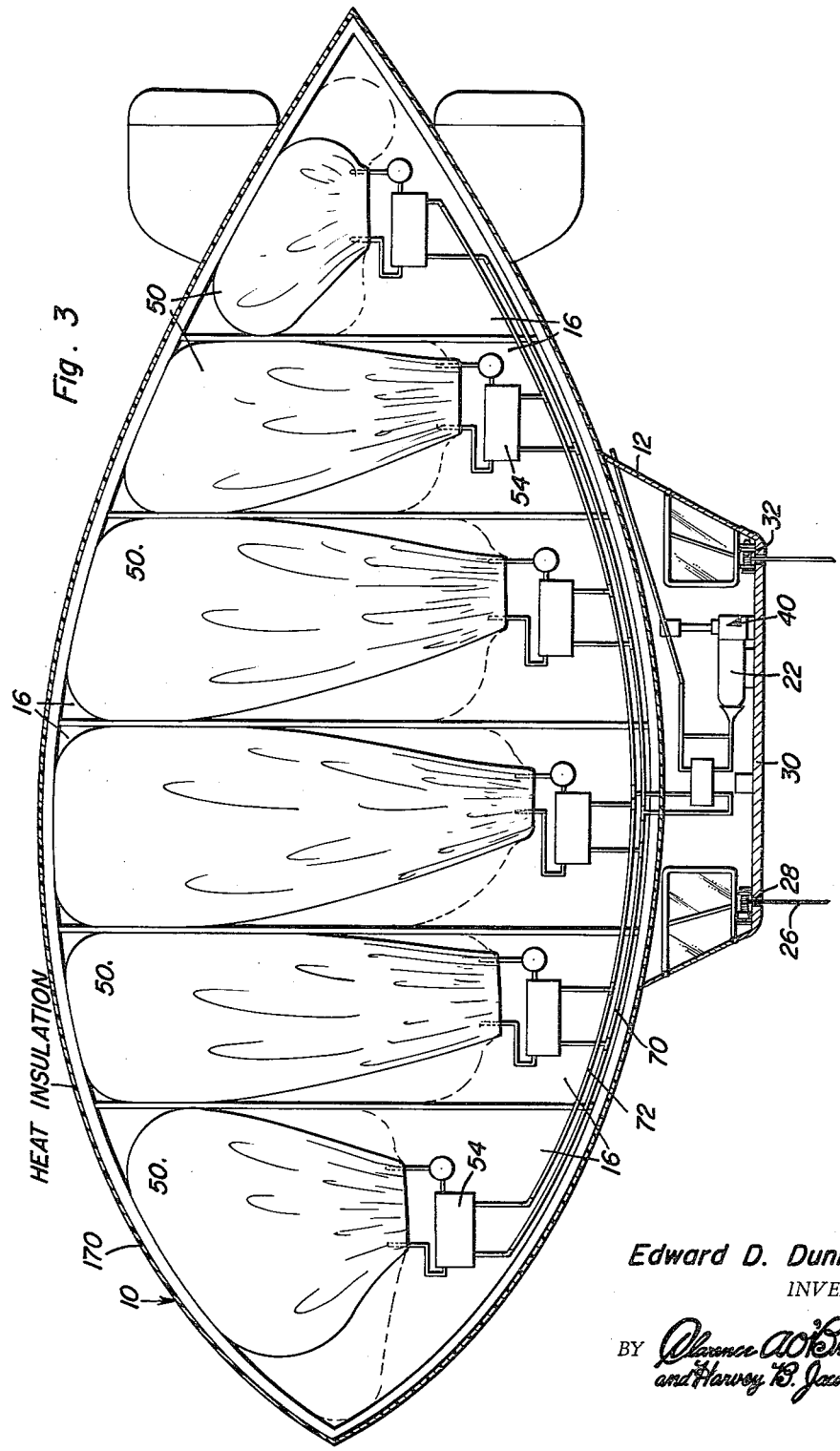
FIGURE 3 is a view in vertical longitudinal section of a rigid type of aircraft such as that illustrated in FIGURE 1 in accordance with the principles of the invention, parts of the cargo carrying equipment being omitted therefrom.
Figure 4:
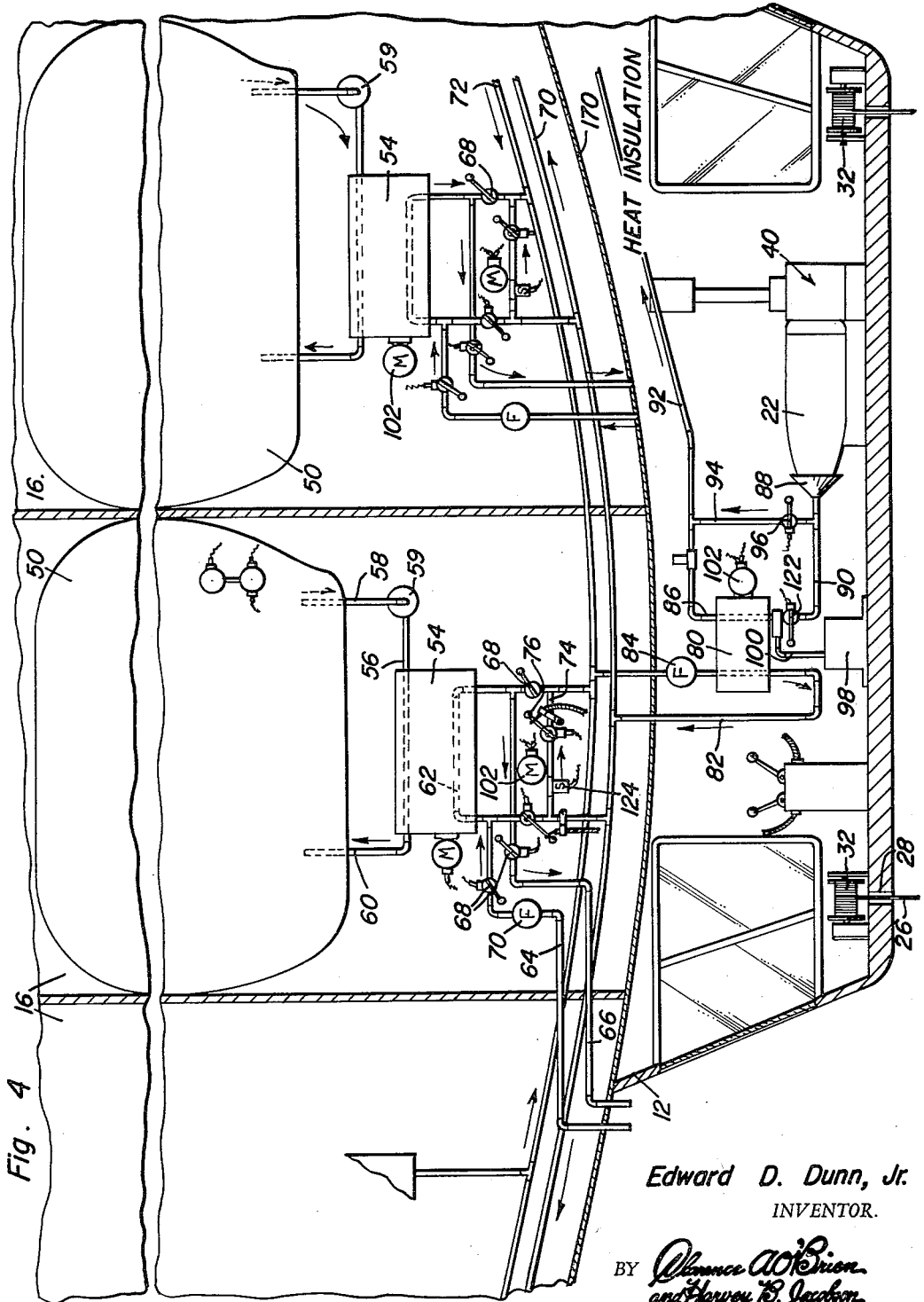
FIGURE 4 is a detail view taken upon an enlarged scale of a portion of the apparatus as shown in FIGURE 3 and showing the details of the structure and controls for the heat exchange system forming an essential feature of this invention.
Figure 5:
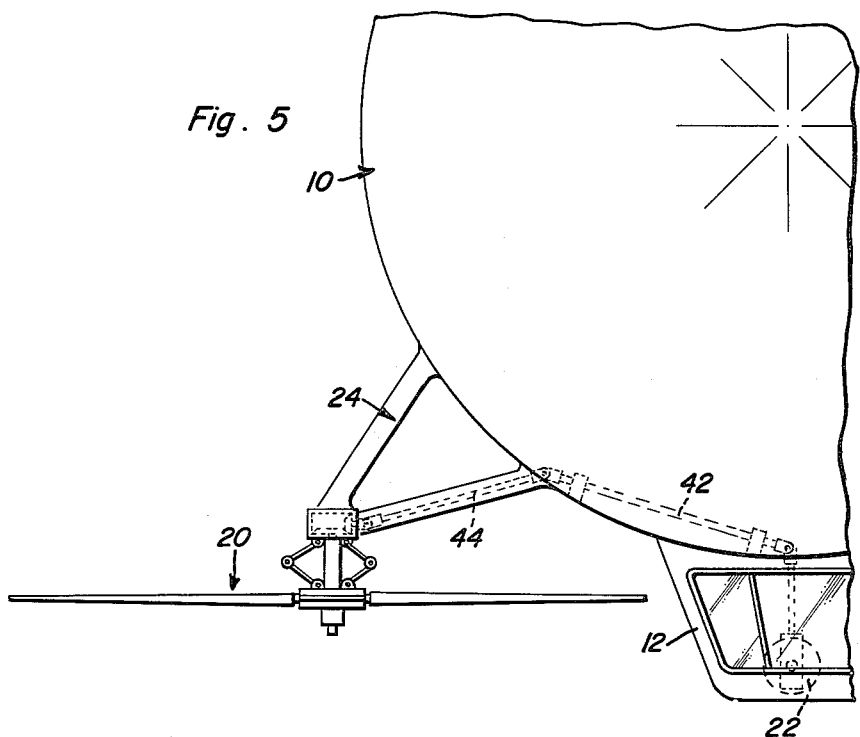
FIGURE 5 is a fragmentary view similar to FIGURE 2 but upon an enlarged scale of one of the helicopter blade assemblies and showing in dot and dash lines and in diagrammatic form the driving means for the same.

As illustrated in FIGURES 3 and 4, the body of the air craft 10 includes a suitable elongated frame which may be provided with any desired type of covering material in accordance with conventional practice. Preferably this frame is divided into longitudinally spaced compartments each of which is identified by the numeral 16 and each of which compartment constitutes a cell for receiving the buoyant gas containers by which buoyancy is provided for the vessel. In accordance with this invention two different types of buoyancy containers are provided such as the construction shown in FIGURES 3 and 4 for the rigid type of aircraft or that shown in FIGURE 8 for the non-rigid type of aircraft.

In addition to the buoyancy containers the aircraft is provided with a combined propulsion and elevating means preferably consisting of one or more propeller or helicopter rotor units each having any conventional type of variable pitch blades and indicated generally by the numeral 20 and which as set forth hereinafter are operatively connected to the power plant of the vessel such as an internal combustion engine 22. The rotor units 20 are rotatably supported by strut assemblies designated generally at 24 and which support the rotor assemblies in such a manner that the latter may be adjustably positioned in various desired directions so that the thrust of the propeller or helicopter blades may be varied from the vertical position in which they will assist in elevating the craft or a horizontal position in which their thrust will be entirely propulsive upon the craft or intermediate positions which will combine both functions as desired.

By way of example only, forward and rear propeller units each with adjustable pitch blades may be provided. Thus, the rear unit may be so positioned on its support means as to give a forward thrust while the forward unit may effect a lifting or lowering action. It will be further appreciated that it is within the scope of the invention to utilize any conventional means for adjustable feathering or varying the pitch of any of the blades of any unit 20.

Inasmuch as the details of the mounting of the rotor units, and the provision for adjusting the thrust of the same by swivelly or otherwise movably supporting the rotor units upon the strut assemblies 24 forms no part of the invention as claimed herein, and as the invention may utilize numerous conventional known constructions and mechanisms for this purpose, a further description thereof has been omitted as being unnecessary, to an understanding of the invention claimed hereinafter.

Figure 1:
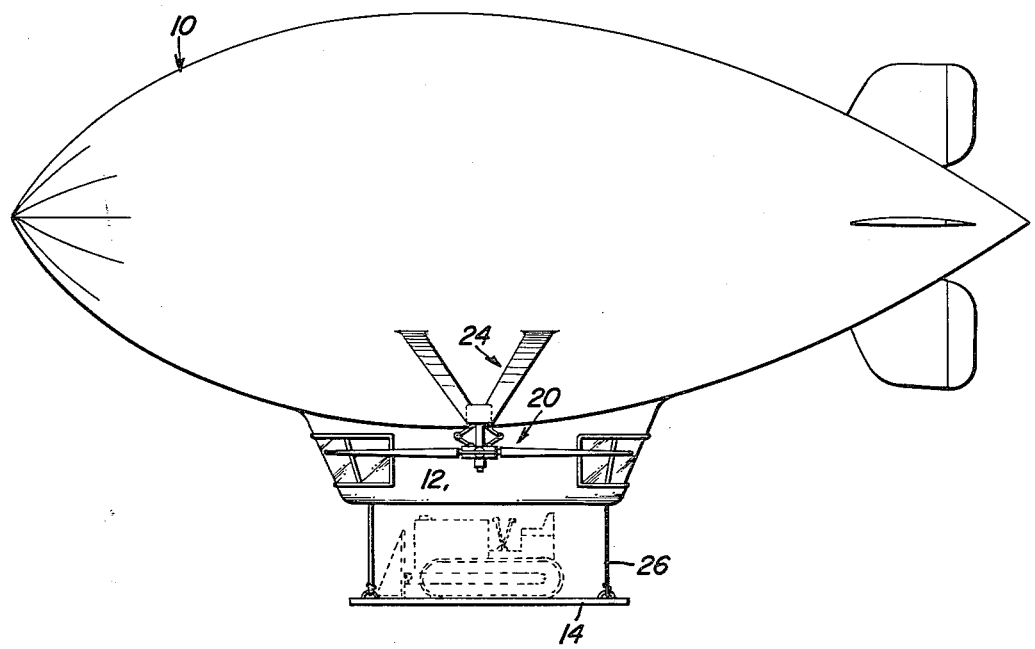
FIGURE 1 is a side elevational view illustrating a suitable form of lighter than air vehicle incorporating the principles of this invention therein and indicating a particular use of the device as a freight carrier.
Figure 2:
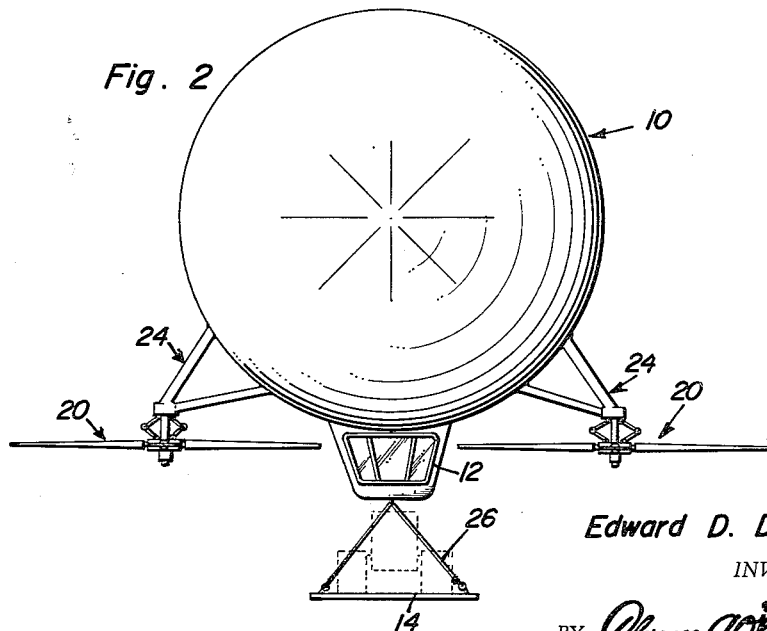
FIGURE 2 is a front elevational view of the apparatus of FIGURE 1.

It will also be apparent that various types of cargo carriers may be provided. In the interest of simplicity, there is illustrated in FIGURES 1, 3 and 4 a platform-like cargo carrier 14 supported by a plurality of cables 26 which are extended through suitable openings 28 in the floor 30 of the hull or cabin 12 and are associated with winches 32 suitably connected to a power source such as the power plant 22 in any manner not shown. In this manner, the support means 14 may be adjustably raised or lowered to facilitate the loading or unloading of the same when the aircraft is in a hovering position, or may be fully retracted against the bottom 30 of the cabin 12 when the service of the support means is no longer required.

In a manner to be subsequently set forth and which forms the essence of the invention, to be hereinafter disclosed and claimed, means are provided for precisely and quickly varying the buoyant lift of the buoyant gas containers of the aircraft so as to precisely vary the effective or net weight of the aircraft between positive and negative values, and this with or without the variable lifting effect which may be obtained through proper positional control and power control of the propeller or helicopter rotor units 20. As a result of the controllable variability of these buoyancy and elevating means, this aircraft is capable of extremely precise and accurate maneuvering control. Thus, it may be caused to hover under various conditions of atmospheric and geographic variations, may be precisely controlled as to its movement both as to direction and as to speed. In addition, the control of the buoyancy enables its load carrying capacity to be widely varied as desired, and also allows ready compensation for changing atmospheric conditions as when the vessel passes from air of one temperature into relatively cool or hotter air, or moves from air currents such as updrafts and downdrafts in the atmosphere.

As previously mentioned the power plant 22 is utilized as a means for operating the helicopter rotor units 20. Thus, the power plant 22 through a gearing assembly indicated generally by the numeral 40 drives the rotors 20 through a suitable driving mechanism which includes a driving shaft 42, shown in FIGURE 5 as extending through the body of the aircraft 10, and a further driving shaft 44 extending through a hollow member of the strut assembly 24. Inasmuch as the precise nature of the driving train connecting the power plant to the propeller or helicopter units 20 is immaterial for the purposes of the invention set forth and claimed herein, a further description of the same is deemed to be unnecessary.

Reference is now made first to FIGURES 3 and 4 for an understanding of the manner in which the principles of this invention with regard to the controllable buoyancy of the aircraft are applied to an aircraft of the rigid type.

Received in each of the compartments 16 in the framing of the aircraft 10 is an expansible container 50 in which is received and permanently retained a buoyant gas such as helium or the like. These containers may be of various constructions of which an elastomeric or inflatable and expansible bag impervious to gases and such as is commonly employed in the rigid type of aircraft may be utilized. The essential characteristic of the container is that it shall be capable of varying its volume as the gas sealed therein is expanded or contracted by a heat interchange. Although this is not necessary, it is highly desirable that the containers for gas bags 50 shall be permanently sealed from the atmosphere so as to permanently retain a given weight of the buoyant gas therein. The buoyant containers are thus retained in the compartment 16 in any desired manner and of course will generally fill the upper portion of the space of such compartment. Due to their sealed construction, no venting or loss of the buoyant gases is anticipated therefore.

The buoyancy of the containers 50 is controllably varied by regulating the volume thereof. This is achieved by effecting a rapid and precisely controlled heating or cooling of the confined buoyant medium to thereby expand or contract the volume of the latter and thus of its expansible container.

In order to effect the controllable application of the heating fluid to the buoyant fluid in the buoyant containers 50, there are provided a plurality of heat exchange units each designated generally by the numeral 54. As illustrated, there is provided one such heat exchange unit for each compartment 16 or for each buoyant container 50 although it will be appreciated that this relationship may be varied as desired and found to be expedient. Thus, it may be found feasible to completely omit the heat exchangers in one or more of the compartments 16 so that the variations in buoyancy may be effected by heat exchange of certain others of these compartments. The principle of operation is however the same.

Referring now more particularly to FIGURE 4 for an understanding of the heat exchange mechanism of this invention it will be seen that the heat exchanger 54 consists of a suitable housing or casing through which extends a buoyant medium heating coil 56. While for diagrammatic purposes and simplicity of illustration the heat exchange coil 56 is shown as a straight pipe, it will be appreciated that any conventional coil arrangement may be provided in the heat exchanger. The heating coil 56 comprises part of a circulating system which includes the inlet pipe 58 and a discharge pipe 60 terminating within the container 50 at opposite sides thereof in order to effect as complete a circulation of the heated fluid therethrough as possible. A fan 59 facilitates circulation of the buoyant medium through the bag 50 and the heat output coil 56.

The heat exchange input pipe or coil for the heat exchanger 54 is indicated at 62. This likewise includes a coil or other heat exchange element within the housing 54 which is placed in intimate heat exchange relation with the heat output coil 56. The heat input coil is selectively and controllably supplied with a heating medium or a cooling medium as desired. The cooling medium consists of inlet and outlet conduits 64 and 66 respectively which communicate with the atmosphere outside of the body of the aircraft 10 and which communicate with the heat input coil 62 under the control of regulating valves or dampers each of which is indicated at 68. A blower or fan 69 in the inlet pipe 64 serves to induce a flow or circulation of cooling air through the input coil 62. Alternatively, the flow of cooling air may be induced by an air scoop located in close juxtaposition to one of the propeller units 20. Thus when it is desired to cool the buoyant gas and thus contract or collapse the receptacles 50 and decrease their buoyant effect upon the vessel, a coolant is supplied by the fan 69 through the heat input unit 62 of the heat exchanger and this in turn will cool the circulating buoyant medium in the heat output coils 56.

In a means to be subsequently set forth automatic and interlinked regulation of the two dampers 68 of the cooling inlet and outlet conduits 64 and 66 are provided, while individual manual control of the cooling fluid of each heat exchange units 54 is provided as disclosed hereinafter.

A means is provided for controllably supplying a heating fluid to any and all of the heat exchangers 54 from a common source of supply. Thus, there is provided a heating fluid conduit system consisting of a pair of conduits 70 and 72 which preferably extend within the frame of the aircraft longitudinally throughout substantially the entire length thereof. These conduits provide a closed circulating system in which there is maintained a heating fluid of any desired character. Although air may be conveniently employed as a readily available, lightweight and easily replaceable fluid, it will be appreciated that other fluids may be employed as may be desired. In any event, the heating fluid conduit system is a closed system in which a continuous volume of the heating fluid is circulated in heat exchange relation between a heat input source and the heat exchangers 54. Each of the heat exchangers has its heat input unit 62 connected to or across the pair of conduits 70 and 72 so that through suitable valves, such as the valve 73 or others not shown, the supply and circulation of heating fluid from the conduit system 70, 72 may be regulated to the individual heat exchangers 54. A by-pass or branch conduit 74 may be provided in the connection of each heat exchanger with the heating fluid conduit system and under the control of the valve or damper 76 may vary the proportion of the heating fluid which is delivered from the conduit system 70, 72 to the heat exchanger. Thus, controllable quantities of a heating fluid from the heating fluid system conduits 70, 72 or of a coolant from the coolant conduits 64, 66, in various proportions may be delivered to the heat exchangers 54 to thus control the heat applied to or subtracted from containers 50.

As previously mentioned, a common source is provided to supply heat into the heating fluid supply system. For this purpose there is provided a single primary or basic heat exchanger unit indicated at 80. This unit includes a heat output coil 82 extending through the heat exchanger body and connected to the conduits 70 and 72 for effective circulation of the heating fluid in these last mentioned conduits through the heat exchanger 80. A fan or blower as at 84 serves to maintain circulation throughout the heating fluid supply system, the heat exchanger 80 and the individual heat exchangers 54. The coil or unit 82 constitutes the heat output side of the basic or primary heat exchanger 80. For the heat input side thereof there is provided a heat input unit or coil 86 which passing through the unit 80 is in intimate heat exchange relation with the output unit 82 thereof. Heating means from various sources may be connected to the heat input unit 86. Thus, the exhaust gases discharged from the internal combustion engine 22 comprising the power plant of the vehicle may be delivered through the intake manifold assembly 88 and the engine exhaust conduit 90 through the input unit 86 and thereafter discharged as by a conduit 92 to the atmosphere in the usual manner for discharging exhaust gases of internal combustion engines of aircraft.

A by-pass 94 is connected across the conduits 90 and 92 under the control of a damper or control valve 96 so as to regulate the rate of flow and volume of exhaust gases which pass through the unit 86.

On occasions when it is desired to substitute for the internal combustion engine or supplement the latter as a source of heat for the primary heat exchanger 80, there is provided any suitable form of furnace as at 98 by which combustion gases or other heated fluids may be delivered by the conduit 100 into the input unit 86 through the conduit 90. Thus, by use of either the exhaust gases from the internal combustion engine 22 or the furnace 98 or both, a flow of heating fluid is effected through the heat input coil 86 to thus put heat into the heat exchanger 80, which in turn delivers heat through the heat output unit 82 to the heating fluid supply system previously desired.

Figure 6:
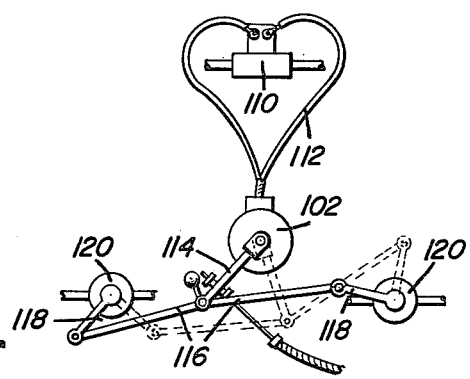
FIGURE 6 is a detail view, partly diagrammatic and showing the manner in which fluid flow control dampers of the heat exchange system are interlinked for synchronous control thereof from a common actuating means together with a control device for the actuating means.

In order to maintain a more instantaneous and effective control of the heat exchange of this system the flow regulating dampers or valves throughout the entire heat exchange system may be each operated by electric motors 102 or other suitable source of power. These electric motors are in turn controlled by suitable automatic controls such as thermostatic switches. Inasmuch as the precise construction of the connection between the motors and the valves and the electrical connection between the control switches and the motors can be of any conventional type, a detailed showing and description thereof has been omitted from the specification in the interest of simplicity. However, by way of example there is shown in FIGURE 6 a typical arrangement for this purpose. Here, an automatic control such as a thermostat 110 suitably associated with a flow line whose temperature is to be controlled is electrically connected by the connections 112 to the electrical circuit which energizes a motor 102. The latter through a crank arm 114 which is connected to a pair of links at 116 is likewise connected for reverse operation to the control arms 118 of the dampers or control valves 120 which control flow through associated conduits. It will be understood that the control dampers or valves 120 will correspond to and may comprise the dampers 68 of the coolant supply conduits 64, 66 or the dampers 96 and 122 respectively of the primary feed by-pass and input lines 94 and 86. In addition, the dampers 76 and 73 may be similarly controlled by the motor 102 of the by-pass conduit 74 under the control of the switch control member 124, as suggested in FIGURE 4.

It is further understood that suitable manual controls may likewise be provided to permit individual actuation of selected heat exchange units for the purpose of individually varying the buoyancy of individual containers 50 throughout the vessels in order to control the trim of the same as well as the over-all buoyancy.

In order that individual adjustment of any heat exchanger unit 54 or 80 or any control element thereof may be readily and precisely adjusted, a dual control system such as that shown in diagrammatic form in FIGURE 9 is employed. In this control system the numeral 130 diagrammatically represents a master control panel or control station at some remote location with respect to the various members controlled by the system and may conveniently be located in the aircraft cabin or hull 12.

A plurality of manually operable control levers each designated as 132 are each connected by a suitable connecting train such as a flexible cable or linkage 134 to the manual operating levers 136 provided at each of the control valves 138. Each of the latter controls flow through a conduit 140. It is intended that the valves 138 and conduits 140 shall be any of the previously described control valves or dampers and flow conduits.

With this arrangement, any of the control elements can be manually operated, either by the manual lever 136 on the control element itself or by the remote control lever 132. Further, the levers 136 or 132 will afford a visual indication, at the unit controlled and at the remote control station, as to the operative position of the associated control element.

The previously described arrangement is particularly adapted for use with the rigid type of aircraft having in each compartment thereof a single expansible bag, a similar arrangement is provided for use with the non-rigid type of aircraft, for an understanding of which reference is now made to FIGURE 8.

It will be understood that in FIGURE 8 there is represented the same general construction of an aircraft 10 having compartments 16 therein as previously described. However, in place of a single bag or expansible buoyant container 50 in each compartment there is provided a ballonet 52 disposed within each buoyant container 50.

A fundamental requirement of the non-rigid type of aircraft is that the gas bag must at all times remain filled in order that the geometrical shape thereof may remain constant despite changes in buoyancy. This is vital in order that the flexible cable control system extending from the cabin or gondola to the rudders, motors and the like may remain taut.

Therefore in the non-rigid aircraft, an adjustable expansible bag or ballonet is disposed within each bag of the buoyant gas. When the volume of the buoyant medium is changed by admitting or venting the buoyant gas therefrom or by thermal changes, a corresponding change is made in the air within the ballonet so that the combined volume of the buoyant gas bag and its ballonet will remain constant and thus the aircraft gas bag will retain a fixed geometric shape and volume.

The application of the principles of this invention to the non-rigid type of aircraft is in consonance with these basic requirements. The ballonet 52 of an expansible or elastomeric material is disposed within the buoyant gas bag or container 50 which has a permanently sealed buoyant medium therein. Instead of varying the volume of the buoyant container 50 by venting or adding the buoyant medium thereto as in conventional practice, the volume is varied by heating or cooling the buoyant medium with the ballonet automatically undergoing a compensating change of volume. FIGURE 8 shows in dotted lines the relatively expanded and contracted conditions of the ballonet. A constant pressure is applied to the air within the ballonet by means of an air inlet pipe 150 whose inlet may be in the form of an airscoop disposed in the air blast from a propeller unit 152. Exhaust from the ballonet is effective by a vent conduit 154 having a conventional pressure relief valve, not shown. As so far described, except for the omission of charging and venting means for the buoyant gas bag 50, the latter and its ballonet are of conventional type.

In order to controllably vary the volume of the buoyant container 50 provision is made for selectively heating or cooling the latter by means of a heat exchanger unit 156 which may be identical with the heat exchanger 54 and the heat exchange system 70, 72 and the control means previously described.

The exchanger 156 thus circulates and heats or cools the buoyant gas of the container 50 very rapidly in a closed circulating system. In many instances, this arrangement will give adequate sensitivity of controlled variation of the buoyancy. However, by also providing a similar heat exchange unit 158 for the air inlet 150 of the corresponding ballonet 52, a much more rapid and relatively greater heat exchange with the buoyant gas medium can be realized. The structure, operation and control of the heat exchanger units 158 is preferably identical with the other heat exchange system hereinbefore set forth except that this is not a closed system inasmuch as the constant pressure air supply for the ballonet must be taken from or vented to the atmosphere each time a change in the volume of the buoyant container 50 is required.

In some instances it may be preferable to also utilize a closed circulating system for the ballonet involving the us of a pump to controllably vary the volume of the ballonet fluid within the receptacle 52. The pump 160 may be utilized for this purpose, or as shown in FIGURE 8, to replace the air blast from the propeller 152 as the constant pressure source.

The operation of this form of the invention as regards controllably varying the buoyancy of the buoyant containers is identical to that previously described.

In all forms of constructions for practicing this invention, it is desirable to obtain as sensitive and responsive a change in buoyancy of the associated buoyant elements of the vehicle in response to actuation of the controls as possible. To this end it is of great importance and advantage to reduce to a minimum the rate and quantity of heat exchange between the buoyant units of the aircraft (or other vehicle having the principles of this invention applied thereto) and the surrounding atmosphere or other ambient medium.

This may be effected by employing a material of relatively great heat insulating property for the body of the vehicle or as a covering therefor or a lining therein, or similarly for use with the individual buoyant units. It is therefore to be understood that the legends applied to the drawings represent, in the interest of simplicity of illustration any structure or means for effecting heat insulating of the buoyant medium from heat exchange with the atmosphere or ambient medium. Such heat insulating coverings are diagrammaticlly indicated at 170 in FIGURES 3, 4 and 8 of the drawings.

Although reference has been made in the specification to a conduit or pipe system for circulating the various fluids, it will be appreciated that this is for simplicity of illustration only and that in actual practice whereby gases are handled as the fluid mediums a duct system rather than a pipe system would probably be necessary.

Figure 7:
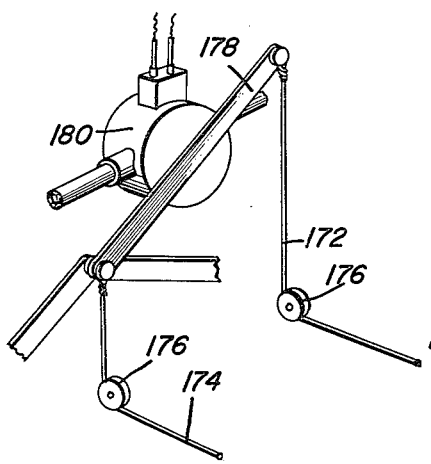
FIGURE 7 is a fragmentary detail perspective view of further features of the heat exchange system control mechanism.

Shown in FIGURE 7 is a slightly modified form of the control means of FIGURE 9, wherein the latter figure employed a flexible cable as the connecting means between the remote control lever 132 and the associated control element 138 and its lever 136, FIGURE 7 uses a conventional cable and pulley connection. Thus, the manually operable control cables 172, 174 connected to the remote control levers 132 are entrained over suitably mounted guide pulleys 176 and are connected to the manual control lever 178 of the control element 180. The operation is identical with that previously described.

The foregoing is considered as illustrative only of the principles of the invention. Further, since numerous modifications and changes will readily occur to those skilled in the art, it is not desired to limit the invention

What is claimed as new is as follows:

1. An airship comprising a frame, expansible gas containers for buoyant gas secured in said frame for imparting buoyancy to the latter, means for controllably varying the volume of said containers and thereby their buoyant force upon said frame, said last mentioned means comprising means for circulating the buoyant gas into and out of said containers in a closed system while controllably varying the temperature of said buoyant gas during said circulation, propelling means for effecting circulation of said buoyant gas with a forced flow through said containers, a power plant carried by said frame, helicopter blades rotatably mounted upon said frame and drivingly connected to said power plant, said helicopter blades and said gas containers controllably varying between positive and negative limits the effective weight of said aircraft.

2. The combination of claim 1 wherein said volume varying means comprises a heat exchanger disposed in heat exchange relation to said buoyant gas, means for supplying heat to said heat exchanger.

3. The combination of claim 2 wherein said heat supplying means comprises a furnace.

4. The combination of claim 1 wherein said volume varying means comprises a heat exchanger disposed in heat exchange relation to said buoyant gas, means for supplying heat to said heat exchanger, said power plant comprising an internal combustion engine, said heat supplying means including a conduit means receiving exhaust gases from said engine.

5. The combination of claim 1 wherein said volume varying means comprises a heat exchanger disposed in heat exchange relation to said buoyant gas, means for supplying heat to said heat exchanger, said heat supplying means comprises a heating fluid conduit system disposed in said frame, means circulating a heating fluid in said conduit system, a heat exchanger for each of said containers connected to said conduit system.

6. A variable buoyancy airship comprising a frame, a plurality of expansible gas containers secured in said frame in longitudinally spaced relation therein, and each container having a fixed quantity of a buoyant gas confined permanently therein, a heat exchanger associated with each container in heat exchange relation with the confined buoyant gas, a heating fluid conduit system extending longitudinally of said frame, means connecting each heat exchanger to said conduit system for receiving heating fluid therefrom, means for circulating a heating fluid through said conduit system, a ballonet in each container, means for maintaining a substantially constant air pressure in said ballonet, means for effecting controlled temperatures of the air in said ballonet.

7. The combination of claim 6 including means for circulating a cooling fluid through at least some of said heat exchangers.

8. The combination of claim 6 wherein said frame includes a series of compartments, one of said containers and one of said associated heat exchangers being housed in each compartment.

9. The combination of claim 6 wherein said frame includes a series of compartments, one of said containers and one of said associated heat exchangers being housed in each compartment, means effecting a circulation of buoyant gas in a completely closed circuit between its associated heat exchangers and container.

10. The combination of claim 6 wherein said frame includes a series of compartments, one of said containers and one of said associated heat exchangers being housed in each compartment, said container being permanently sealed from the atmosphere, a heating receptacle in each compartment in direct heat exchange relation with said container, means effecting circulation of a fluid heating medium in a completely closed circuit between said receptacle and said heat exchanger.

11. The combination of claim 6 including means for individually controlling the amount of heat exchange between said heat exchangers and containers.

References Cited in the file of this patent

UNITED STATES PATENTS

| | | |
|---|---|---|
| 1,097,201 | Upson | May 19, 1914 |
| 1,729,020 | Szymanski | Sept. 24, 1929 |
| 1,797,502 | Hall | Mar. 24, 1931 |
| 2,180,036 | Dardel | Nov. 14, 1939 |
| 2,428,656 | Elliot et al. | Oct. 7, 1947 |